(12) United States Patent
Deluca

(10) Patent No.: US 8,934,835 B2
(45) Date of Patent: Jan. 13, 2015

(54) COMMUNICATIONS SYSTEM INCLUDING DISPLAY WITH NFC DEVICE ASSOCIATED THEREWITH AND ASSOCIATED METHODS

(75) Inventor: Michael Joseph Deluca, Boca Raton, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 973 days.

(21) Appl. No.: 13/033,972

(22) Filed: Feb. 24, 2011

(65) Prior Publication Data

US 2012/0218082 A1 Aug. 30, 2012

(51) Int. Cl.
H04B 5/02 (2006.01)

(52) U.S. Cl.
USPC ....... 455/41.1; 455/41.2; 340/10.1; 340/10.4; 340/7.5; 340/7.55; 340/572.1; 705/14; 705/14.32; 705/16

(58) Field of Classification Search
CPC ... G06Q 30/02; G06Q 20/3278; G06Q 20/32; G06Q 30/0267; G06Q 30/0241; G06Q 30/0207; H04N 21/4222; H04N 21/4758; H04W 4/008; H04W 92/18; H04B 5/00; H04B 5/0031; H04B 1/38; H04B 5/0025
USPC .................. 705/14.4, 14.73; 340/10.1, 539.1, 340/539.19, 5.65, 10.52; 455/41.1–41.2, 455/557
See application file for complete search history.

(56) References Cited

U.S. PATENT DOCUMENTS

| | | | | |
|---|---|---|---|---|
| 6,577,861 B2 * | 6/2003 | Ogasawara | ................... | 455/419 |
| 7,627,309 B2 * | 12/2009 | Nitta | .......................... | 455/414.2 |
| 7,991,644 B2 * | 8/2011 | Bryant et al. | ................ | 705/26.1 |
| 8,126,505 B2 * | 2/2012 | Tulloch | .......................... | 455/557 |
| 8,532,571 B2 * | 9/2013 | Murray et al. | ................ | 455/41.1 |
| 8,626,591 B2 * | 1/2014 | Ablowitz et al. | ................ | 705/16 |
| 2002/0094787 A1 * | 7/2002 | Avnet et al. | ..................... | 455/68 |
| 2002/0116268 A1 * | 8/2002 | Fukuda | .......................... | 705/14 |
| 2003/0006911 A1 * | 1/2003 | Smith et al. | .................... | 340/988 |

(Continued)

FOREIGN PATENT DOCUMENTS

WO 2008/087431 7/2008 ............ H04M 1/725

OTHER PUBLICATIONS

"Using Mobile Near-Field Communications in Advertising Media for Consumer Acquisition, Promotion and Transactions" AD Venture Media, 2009.

(Continued)

Primary Examiner — Daniel Wu
Assistant Examiner — Son M Tang
(74) Attorney, Agent, or Firm — Allen, Dyer, Doppelt, Milbrath & Gilchrist, P.A.

(57) ABSTRACT

A communications system includes a display configured to display at least one time variable image, at least one passive near field communications (NFC) device associated with the display, and a media device. An identifier is associated with the at least one passive NFC device. A mobile wireless communications device includes a second NFC device, a wireless transceiver, and a processor. The processor is configured to receive, via communication between the at least one passive NFC device and the second NFC device, an identifier for the at least one passive NFC device. The processor is also configured to send, via the wireless transceiver and to the media device, the identifier and the identifier time, and receive, from and media device and via the wireless transceiver, data relating to the at least one time variable image based upon the identifier and an identifier time based upon the identifier.

22 Claims, 6 Drawing Sheets

(56) References Cited

U.S. PATENT DOCUMENTS

| | | |
|---|---|---|
| 2003/0097302 A1* | 5/2003 | Overhultz et al. ............ 705/14 |
| 2005/0233772 A1 | 10/2005 | McDonnell .................. 455/566 |
| 2007/0136130 A1* | 6/2007 | Liu et al. ...................... 705/14 |
| 2009/0137204 A1 | 5/2009 | Chang ......................... 455/41.1 |
| 2009/0143104 A1* | 6/2009 | Loh et al. .................... 455/558 |
| 2009/0303019 A1* | 12/2009 | Trappeniers et al. ...... 340/10.41 |
| 2010/0030636 A1* | 2/2010 | Vijayshankar et al. .... 705/14.33 |
| 2010/0161410 A1* | 6/2010 | Tulloch ..................... 705/14.45 |
| 2010/0174598 A1* | 7/2010 | Khan et al. ................ 705/14.32 |
| 2010/0271177 A1 | 10/2010 | Pang et al. ................. 340/10.1 |
| 2011/0320293 A1* | 12/2011 | Khan ............................. 705/16 |
| 2012/0005026 A1* | 1/2012 | Khan et al. ................. 705/14.64 |
| 2012/0041823 A1* | 2/2012 | Khan ......................... 705/14.64 |
| 2012/0072943 A1* | 3/2012 | Pan ............................... 725/23 |
| 2013/0029602 A1* | 1/2013 | Gonzalez et al. ............ 455/41.2 |

OTHER PUBLICATIONS

"*Near Field Communication and the NFC Forum: The Keys to Truly Interoperable Communications*" NFC Forum.

Holleis, et al. "*Advertising with NFC*" DOCOMO Euro Labs.

* cited by examiner

US 8,934,835 B2

COMMUNICATIONS SYSTEM INCLUDING DISPLAY WITH NFC DEVICE ASSOCIATED THEREWITH AND ASSOCIATED METHODS

TECHNICAL FIELD

The present disclosure relates to communications systems, and, more particularly, to mobile wireless communications systems and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multifunction devices usually allow electronic mail (email) messages to be sent and received wirelessly, as well as access the internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters.

NFC posters are an inexpensive way to communicate supplemental details about information, such as an advertisement, conveyed on the poster. By tapping an NFC enabled smart phone on an area of the poster having a passive NFC tag, the smart phone is able to send identifier information related to the passive NFC tag over the cellular network and receive supplemental details related to the area of the poster. The supplemental details may then be displayed by the smart phone. However, the NFC poster has a pre-printed static display and is unable to present multiple types of advertisements in a cost effective manner. Static displays are disadvantageous in areas where advertising space is scarce, such as areas with a high volume of advertisement consumers or mall kiosks. Thus, what is desired is a system for providing cost effective supplemental information while addressing disadvantages of NFC posters with static displays.

DETAILED DESCRIPTION

Figure 1:
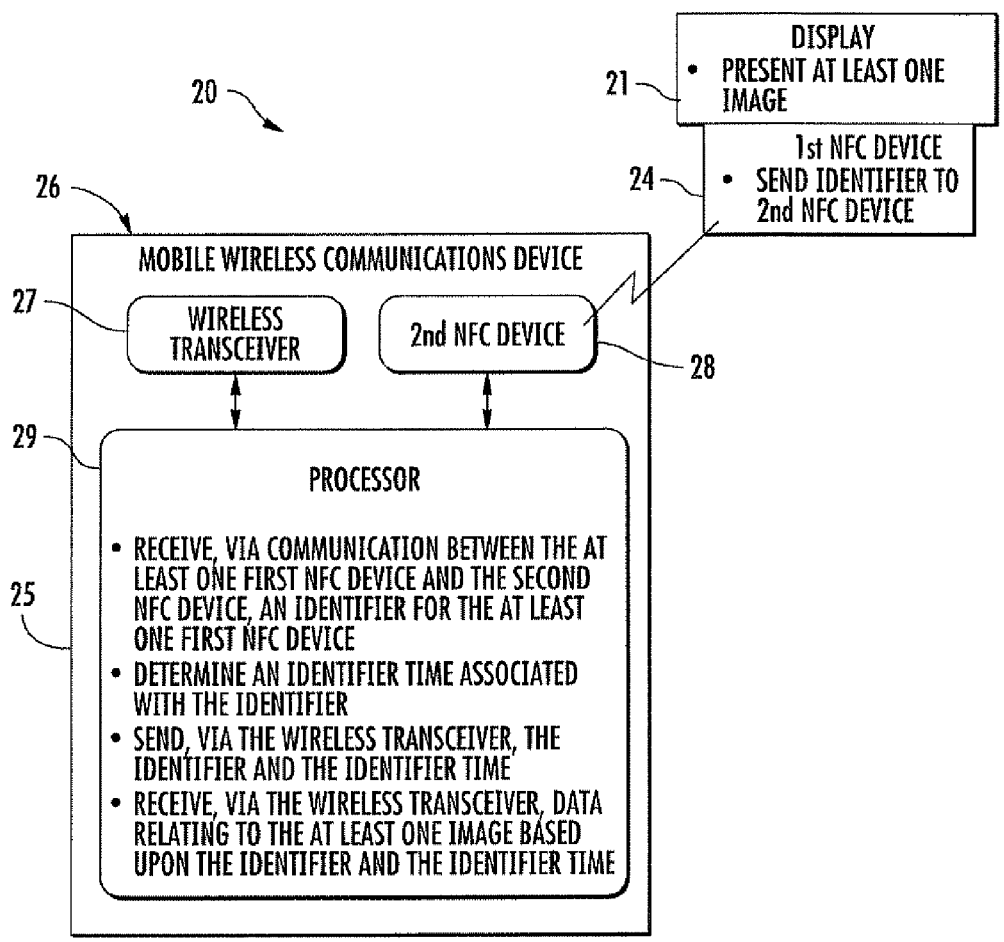
FIG. 1 is a schematic block diagram of an example embodiment of a communications system in accordance with the present disclosure.

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation and multiple prime notation is used to indicate similar elements or steps in alternative embodiments.

Generally speaking, a communications system may include a video display configured to display at least one time variable image, and at least one passive near field communications (NFC) device associated with the display. The at least one passive NFC device has an identifier associated therewith. The communications system may also include a media device, and mobile wireless communications device such as a smart phone, which may comprise a second NFC device, a wireless transceiver, and a processor coupled to the second NFC device, and the wireless transceiver. The processor may be configured to receive, via communication between the at least one passive NFC device and the second NFC device, the identifier associated with the at least one passive NFC device. The processor may also send, via the wireless transceiver and to the media device, the identifier. The processor may be further configured to receive, from the media device and via the wireless transceiver, data relating to the at least one time variable image based upon the identifier and an identifier time.

This communications system advantageously enables the quick and easy distribution of additional information about time variable images (e.g. changing advertisements) to the mobile wireless communications system. Further, basing the data about an image sent to the mobile wireless communications device upon an identifier time allows the system to function without updating the identifiers of respective passive NFC devices when images being presented by the display change, thereby reducing the complexity of the system.

The processor may be configured to determine the identifier time and to send the identifier time to the media device. Additionally or alternatively, the media device may be configured to determine the identifier time.

The mobile wireless communications device may include a mobile display coupled to the processor, and the processor may be configured to present the data on the mobile display. The data may comprise a web link, and the processor may be configured to access the web link upon receipt thereof.

In some applications, the display may comprise an electronic display configured to display the at least one time variable image as a sequence of different images. In other applications, the display may be a substrate, and the at least one time variable image may be printed thereon. The at least one time variable image may comprise a plurality thereof, and the at least one passive NFC device may comprise a plurality of passive NFC devices positioned adjacent respective different images.

The media device may comprise a media server. In this case, the processor may be configured to send the identifier to the media server, and the media server may be configured to generate the data based upon the identifier and the identifier time, and cause the data to be wirelessly sent the mobile wireless communications device.

The media device may comprise a controller. The controller may be associated with the display, and a controller wireless transceiver may be coupled thereto. The processor may be configured to send the identifier to the controller via the wireless transceiver and the controller wireless transceiver. In this case, the controller may be configured to generate the data based upon the identifier and the identifier time, and to send the data to the mobile wireless communications device.

A method aspect is directed to a communications method that may comprise associating at least one passive near field communications (NFC) device with a display, and displaying at least one time variable image using the display. The method may also include receiving, via communication between the at least one passive NFC device and a second NFC device of a mobile wireless communications device, an identifier for the at least one passive NFC device. The method may further include sending, via a wireless transceiver in communication with a processor of the mobile wireless communications device, the identifier to a media device. The method may additionally include receiving, from the media device and via the wireless transceiver of the mobile wireless communications device, data relating to the at least one time variable image based upon the identifier and an identifier time.

With initial reference to FIG. 1, a communications system 20 is now described. The communications system 20 includes a mobile wireless communications device 26 and a display 21. The display 21 may be an electronic display (e.g. LCD, Plasma, CRT), or may be a non-electronic display, such as a poster or sign. The display 21 is configured to present at least one image (e.g. an advertising image). A passive near field communications (NFC) device 24 is associated with the display 21, and has an identifier associated therewith.

By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used. Passive NFC devices require no internal power source and receive their operating power from the communication signal received from an active NFC device.

Example mobile wireless communications devices 26 may include portable or personal media players (e.g., music or MP3 players, video players, etc.), remote controls (e.g., television or stereo remotes, etc.), portable gaming devices, portable or mobile telephones, smartphones, tablet computers, etc.

The mobile wireless communications device 26 includes a housing 25 carrying a processor 29, a wireless transceiver 27, and a second NFC device 28. Those skilled in the art will appreciate that the mobile wireless communications device 26 may include other components, such as input devices, displays, memories, speakers, and image sensors. The wireless transceiver 27 and second NFC device 28 are coupled to the processor 29. The wireless transceiver 27 may include a cellular transceiver, and may be configured to perform both voice and data cellular communications. The wireless transceiver 27 may also include other types of transceivers, such as a Bluetooth transceiver, for example.

The passive NFC device 24 is configured to send the identifier to the second NFC device 28 based upon proximity therewith. The identifier may include an NFC device identification number, phrase, or code. Additionally or alternatively, the identifier may include information such as a NFC device location or NFC device owner.

The processor 29 is configured to receive the identifier for the passive NFC device 24 via the second NFC device 28.

The processor 29 then sends the identifier to a media device 45 (discussed in detail below) via the wireless transceiver 27. The processor 29 in turn receives data relating to the at least one time variable image based upon the identifier and the identifier time. The identifier time may be based upon the date and/or time the identifier was received, or the date and/or time that NFC communications were established between the passive and second NFC devices 24, 28. The data may be advertising data, such as visual, audio, and/or visual advertisements. This data may, in some applications, be an updated version of information contained in the image, such as a flight or train arrival or departure time.

The fact that the data is based upon both the identifier and the identifier time is particularly useful in reducing the complexity of the display 21 and the associated passive NFC device 24. For example, when the image(s) presented on the display are changed, the passive NFC device 24 may still transmit a same identifier, as the identifier time can be used to determine which image prompted the mobile wireless communications device 26 to be brought within NFC communications range with the passive NFC device 24.

Figure 2:
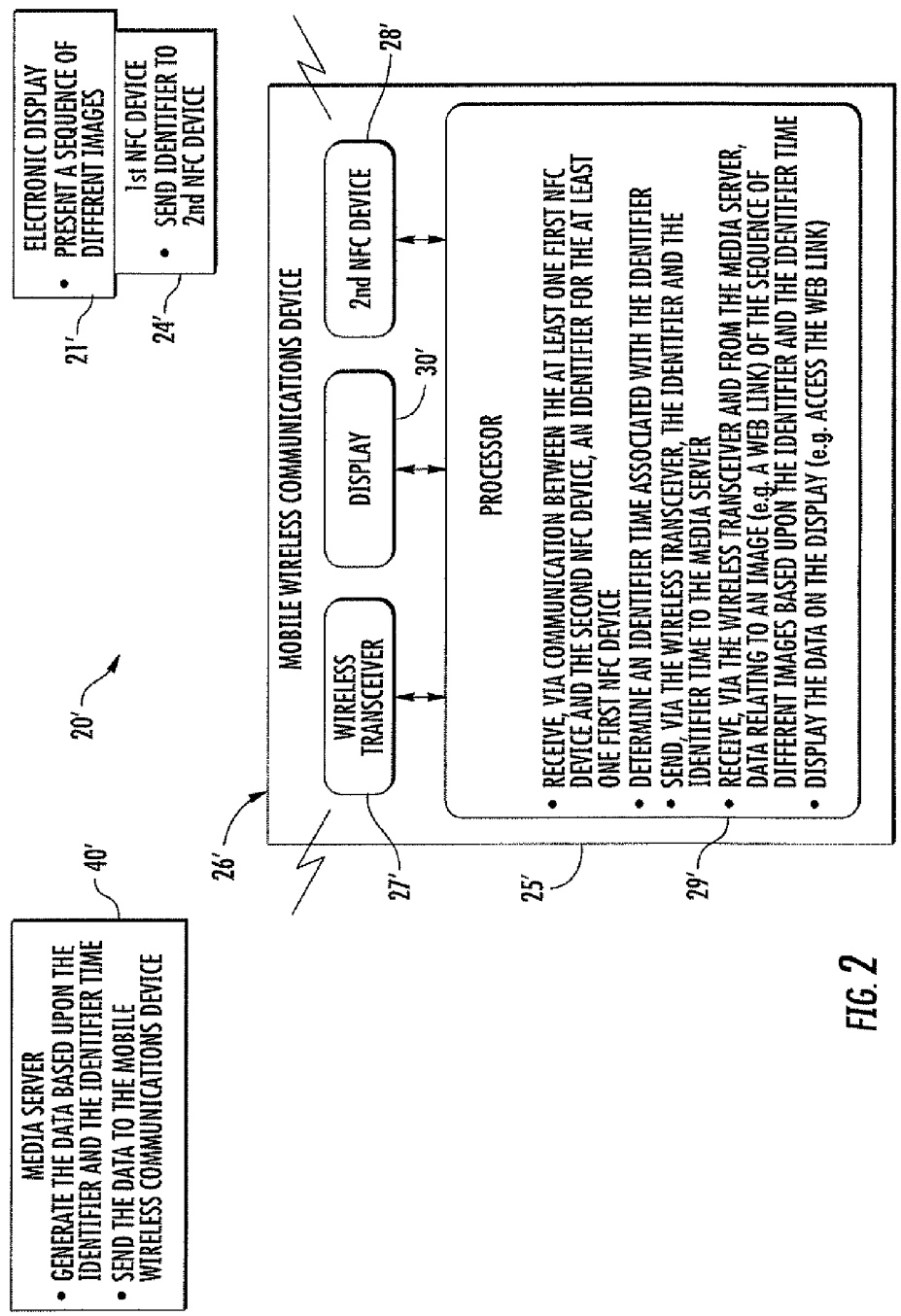
FIG. 2 is a schematic block diagram of another example embodiment of a communications system in accordance with the present disclosure.

With reference to FIG. 2, one example embodiment of the communications system 20' is now described. Here, the mobile wireless communications device 26' includes a display 30' coupled to the processor 29', in addition to the wireless transceiver 27' and second NFC device 28'. In addition, here, the display is an electronic display 21', and presents a sequence of difference images. It should be understood that multiple images may be displayed at once in the sequence, that a single image may be displayed at a time in the sequence, or any combination thereof.

There may be a plurality of passive NFC devices 24'. Each passive NFC device 24' has a unique identifier associated therewith. These passive NFC devices 24' may be associated with the electronic display 21' in a variety of ways. For example, the passive NFC devices 24' may be positioned so as to border adjacent different portions of the electronic display 21'. Alternatively, the passive NFC devices 24' may be positioned so as to be above or below the electronic display 21' and may form a grid or other pattern associating each passive NRC device with a unique area of the display. Additionally, the passive NFC devices 24' may be spaced apart from the electronic display 21', for example carried by a member spaced apart from the electronic display.

Figure 4:
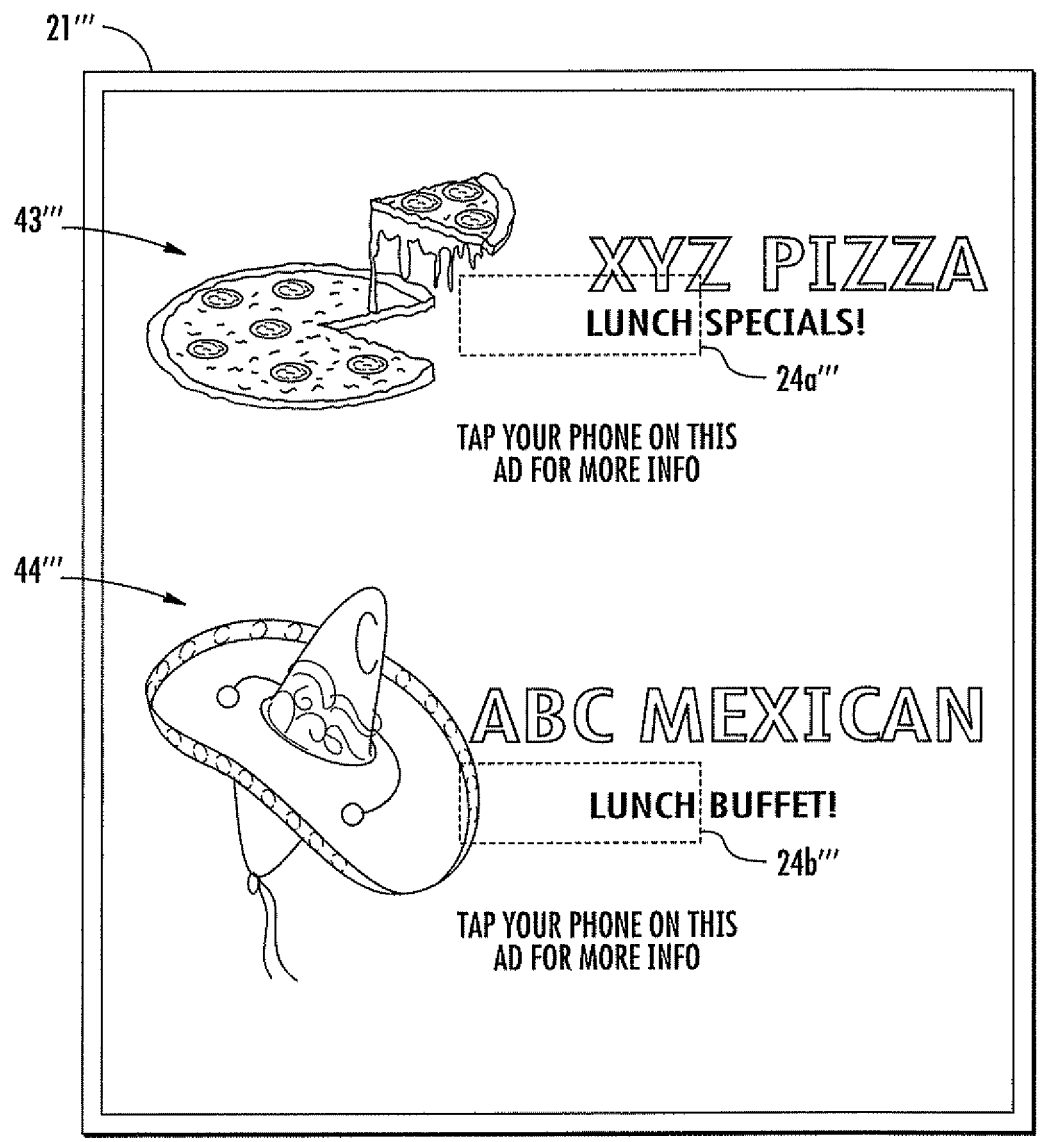
FIG. 4 is an electronic display, such as may be used with the communications systems of FIGS. 1-2, displaying multiple images.

Furthermore, the passive NFC devices may be carried by a housing and may be positioned behind different portions of the electronic display 21'. Such an example is shown in FIG. 4. Here, the electronic display 21''' is displaying an XYZ Pizza advertisement 43''', and an ABC Mexican 44''' advertisement. The passive NFC device 24a''' is positioned behind the portion of the display 21''' on which the XYZ Pizza advertisement 43''' is displayed, and the passive NFC device 24b''' is positioned behind the portion of the display on which the ABC Mexican advertisement 44''' is displayed.

Referring again to FIG. 2, the media server in this communications system 20' is a media server 40'. The processor 25' here determines the identifier time associated with the identifier, and sends the identifier and the identifier time to the media server 40' via the wireless transceiver 27'. The media server 40' generates the data based upon the identifier and the identifier time, and then sends the data to wireless transceiver 27' of the mobile wireless communications device 26'. The media server 40' may determine which image of the sequence thereof prompted the mobile wireless communications device 26' to be placed within NFC communications range thereof based upon the identifier time (e.g. the identifier time may be 1:23 PM, and the media server 40' may determine that the passive NFC device 24' was associated with a given image displayed at 1:23 PM). The processor 29' receives the data and displays the data on the display 30'. Here, the data is a web link, and the processor 29' displays the data by accessing the web link, such as by launching a web browser.

It should be appreciated that the media server 40' and mobile wireless communications device 26' may communicate directly, or may communicate via a wide area network (WLAN), such as the Internet. In such a case, the mobile wireless communications device 26' may have a wireless connection to the WLAN, and the media server 40' may have a wired connection to the WLAN, for example. Those elements not specifically described are similar to those of the communications system 20 described above and need no further description.

Figure 3:
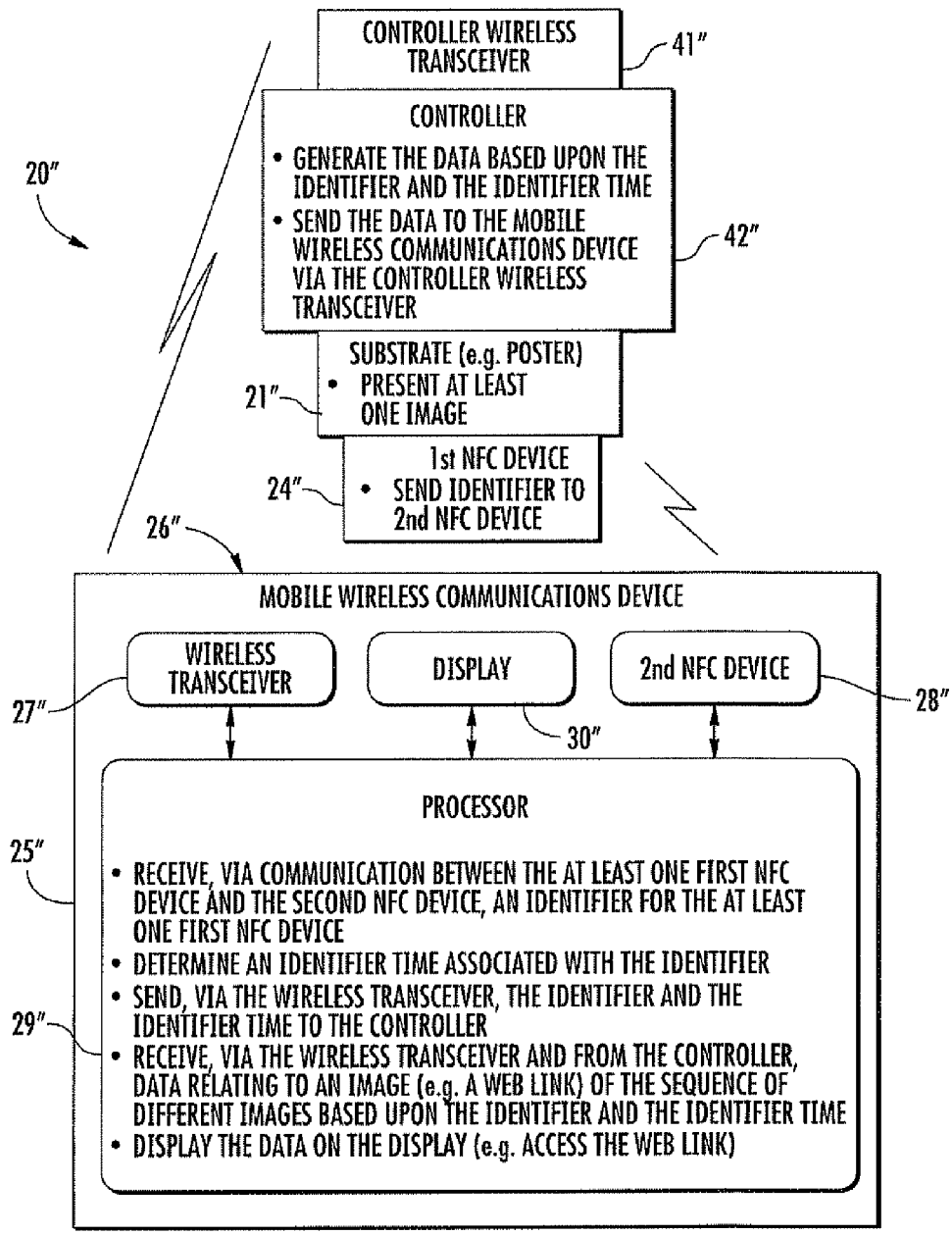
FIG. 3 is a schematic block diagram of a further example embodiment of a communications system in accordance with the present disclosure.

A further embodiment of a communications system 20" is now described with reference to FIG. 3. In this embodiment, the display is a substrate 21", such as a poster, and the passive NFC device 24" is associated therewith. In addition, the media device here is a controller 42", which has a controller wireless transceiver 41" associated therewith. The processor 29" sends the identifier to the controller 42", via the wireless transceiver 27" and the controller wireless transceiver 21". The controller 42" in turn generates the identifier time, generated the data based upon the identifier and the identifier time, and sends the data to the mobile wireless communications device 26" via the controller wireless transceiver 41" and the wireless transceiver 27". Those elements not specifically described are similar to those of the communications system 20 described above and need no further description.

Figure 5:
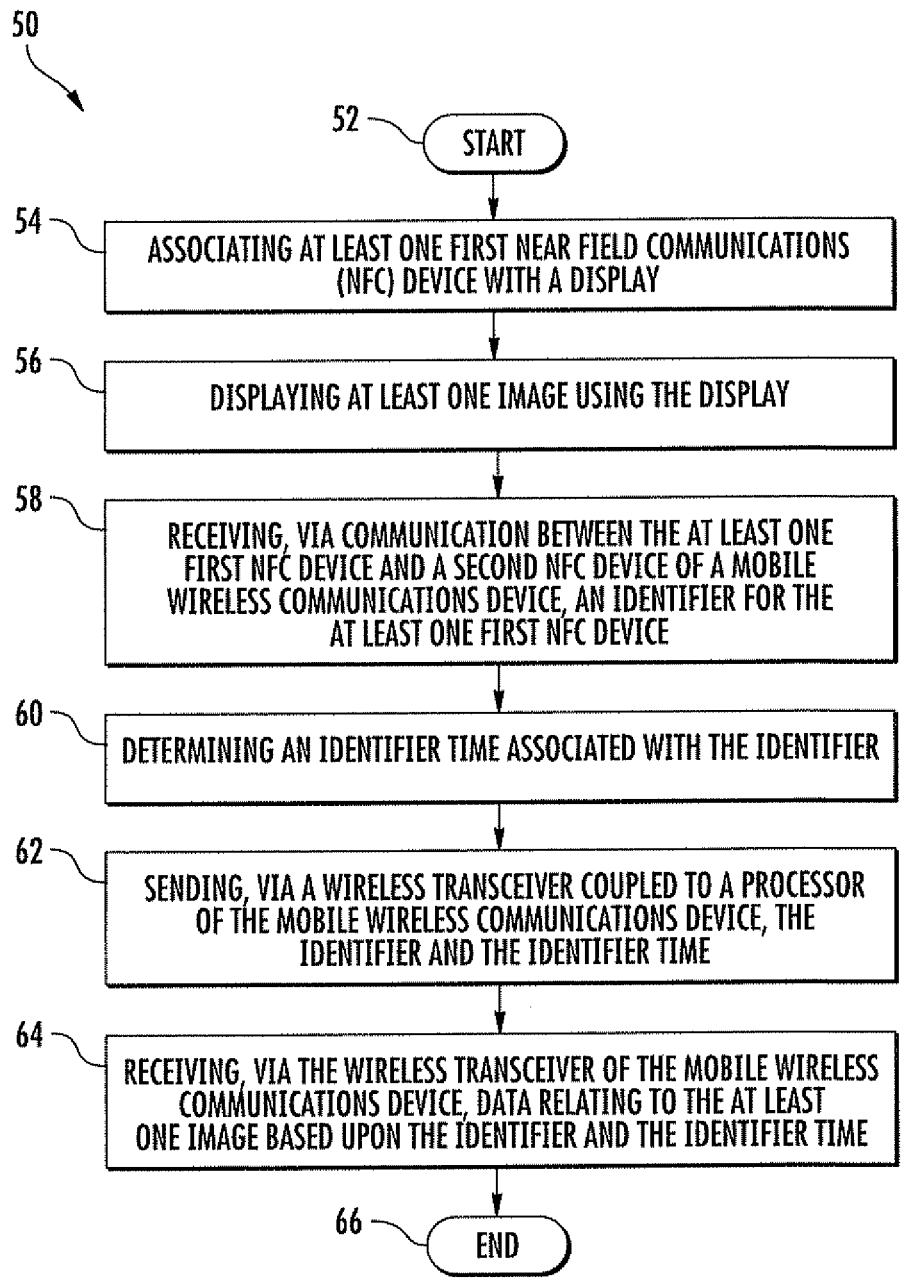
FIG. 5 is a flowchart of a communications method in accordance with the present disclosure.

With reference to the flowchart 50 of FIG. 5, a communications method is now described. After the start (Block 52), at least one passive NFC device is associated with a display (Block 54). Then, at least one time variable image is displayed using the display (Block 56). Next, an identifier for the at least one passive NFC device is received via communication between the at least passive NFC device and a second NFC device of a mobile wireless communications device (Block 58).

Then, an identifier time is associated with the identifier (Block 60). Thereafter, the identifier and the identifier are sent using a wireless transceiver coupled to a processor of the mobile wireless communications device (Block 62). Next, data relating to the at least one time variable image and based upon the identifier and the identifier time is received via the wireless transceiver (Block 64). Block 66 indicates the end of the method.

Example components of a mobile wireless communications device 1000 that may be used in accordance with the above-described embodiments are further described below with reference to FIG. 6. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 6:
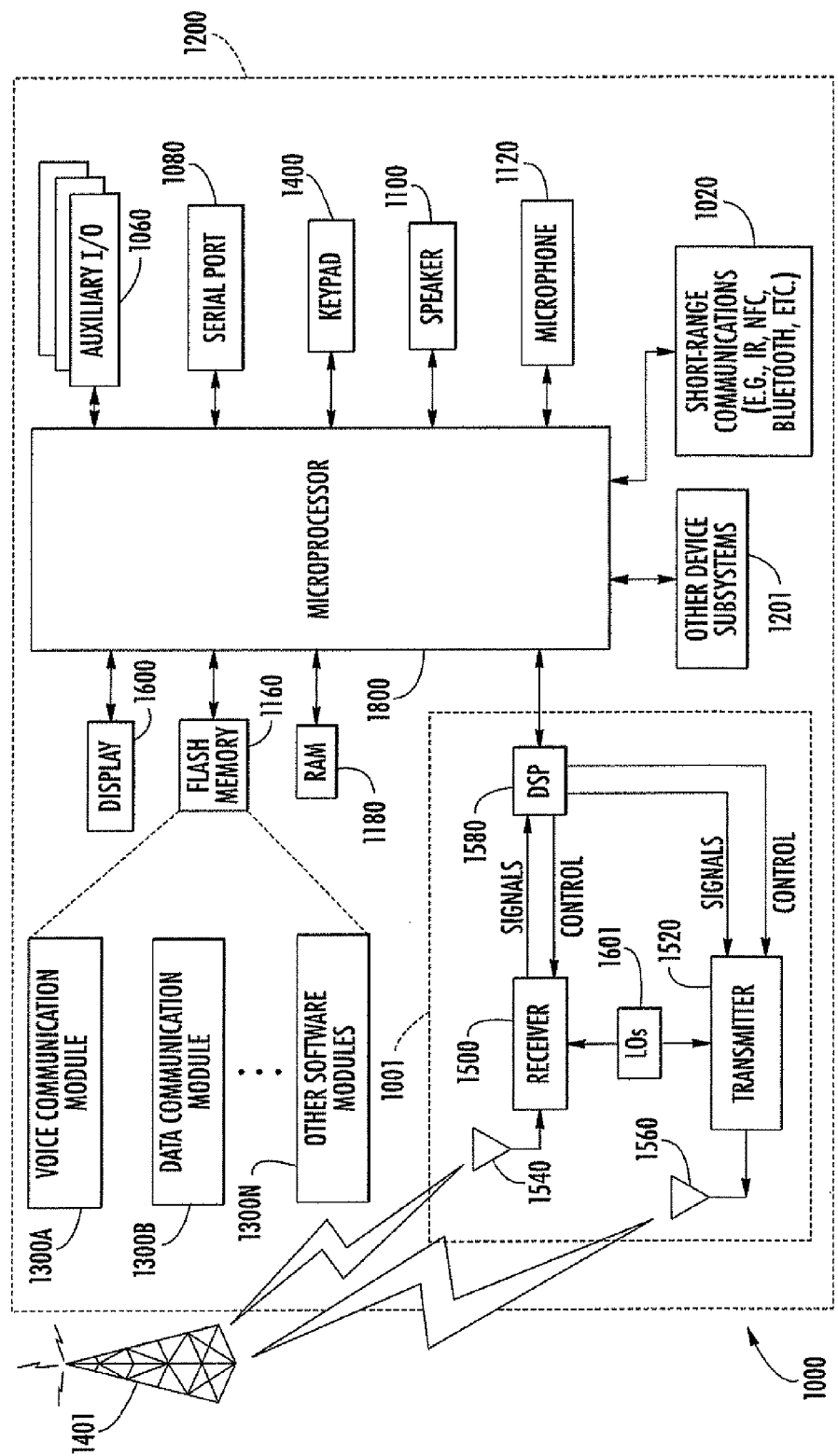
FIG. 6 is a schematic block diagram illustrating example components of a mobile wireless communications device that may be used with the communications systems of FIGS. 1, 2, and 3.

In addition to the processing device 1800, other parts of the mobile device 1000 are shown schematically in FIG. 6. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General. Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC device or NFC tag via NFC communications.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A communications system comprising:
   a electronic display configured to display a plurality of different images in a sequence, each image having respective data associated therewith;
   at least one passive near field communications (NFC) device associated with said electronic display and having an identifier associated therewith;
   a media device configured to determine, based upon the identifier from the at least one passive NFC device and an identifier time, a given image in the sequence that was displayed on said electronic display at the identifier time; and
   a mobile wireless communications device comprising
      a second NFC device,
      a wireless transceiver, and
      a processor coupled to said second NFC device, and said wireless transceiver, and configured to
         receive, via communication between said at least one passive NFC device and said second NFC device, the identifier associated with said at least one passive NFC device,
         send, via said wireless transceiver, the identifier to said media device, and
         receive, from said media device and via said wireless transceiver, data relating to the given image that was displayed on said electronic display at the identifier time based upon the identifier and an identifier time.

2. The communications system of claim 1, wherein said processor is configured to determine the identifier time and to send the identifier time to said media device.

3. The communications system of claim 1, wherein said media device is configured to determine the identifier time.

4. The communications system of claim 1, wherein said mobile wireless communications device further comprises a mobile display coupled to said processor, and wherein said processor is configured to present the data on said mobile display.

5. The communications system of claim 1, wherein the data relating to the given image comprises a web link; and wherein said processor is configured to access the web link upon receipt thereof.

6. The communications system of claim 1, wherein said electronic display comprises a video display.

7. The communications system of claim 1, wherein at least some of the images are displayed on the electronic device at a same time in the sequence are in different positions on the electronic display; and wherein said at least one passive NFC device comprises a plurality of different passive NFC tags adjacent respective different image positions on the electronic display.

8. The communications system of claim 1, wherein said media device comprises a media server; wherein said processor is configured to send the identifier to the media server via said wireless transceiver; and wherein said media server is configured to generate the data relating to the given image based upon the identifier and the identifier time, and cause the data relating to the given image to be wirelessly transmitted to said mobile wireless communications device.

9. The communications system of claim 1, wherein said media device comprises a controller associated with the electronic display; further comprising a controller wireless transceiver coupled to said controller; wherein said processor is configured to send the identifier to the controller via said wireless transceiver and said controller wireless transceiver; and wherein said controller is configured to generate the data relating to the given image based upon the identifier and the identifier time, and to send the data relating to the given image to said mobile wireless communications device.

10. A mobile wireless communications device for use with an electronic display configured to display a plurality of different images in a sequence, each image having respective data associated therewith, at least one passive near field communications (NFC) device associated with the electronic display and having an identifier associated therewith, and a media device configured to determine, based upon the identifier from the at least one passive NFC device and an identifier time, a given image in the sequence that was displayed on the electronic display at the identifier time, the mobile wireless communications device comprising:
 a second NFC device,
 a wireless transceiver, and
 a processor coupled to said second NFC device, and said wireless transceiver, and configured to
  receive, via communication between the at least one passive NFC device and said second NFC device, the identifier associated with the at least one passive NFC device,
  send, via said wireless transceiver, the identifier to the media device, and
  receive, from said media device and via said wireless transceiver, data relating to the given image that was displayed on the electronic display at the identifier time based upon the identifier and an identifier time.

11. The mobile wireless communications device of claim 10, wherein said mobile wireless communications device further comprises a mobile display coupled to said processor, and wherein said processor is configured to present the data on said mobile display.

12. The mobile wireless communications device of claim 10, wherein the data relating to the given image comprises a web link; and wherein said processor is configured to access the web link upon receipt thereof.

13. The mobile wireless communications device of claim 10, wherein said processor is configured to determine the identifier time and to send the identifier time to said media device.

14. The mobile wireless communications device of claim 10, wherein said media device is configured to determine the identifier time.

15. A method for using a mobile wireless communications device with an electronic device displaying a plurality of different images in a sequence and having at least one near field communications (NFC) device associated with the display, each image having respective data associated therewith the method further comprising:
 receiving, via communication between the at least one passive NFC device and a second NFC device of the mobile wireless communications device, an identifier associated with the at least one passive NFC device;
 sending, via a wireless transceiver coupled to a processor of the mobile wireless communications device, the identifier to a media device configured to determine, based upon the identifier from the at least one passive NFC device and an identifier time, a given image in the sequence that was displayed on the electronic display at the identifier time; and
 receiving, from the media device and via the wireless transceiver of the mobile wireless communications device, data relating to the given image that was displayed on said electronic display at the identifier time based upon the identifier and an identifier time.

16. The communications method of claim 15, wherein the identifier time is determined and sent to said media device, using the processor.

17. The communications method of claim 15, the identifier time is determined by the media device.

18. The communications method of claim 15, further comprising presenting the data relating to the given image on a mobile display of the mobile wireless communications device, using the processor.

19. The communications method of claim 15, wherein the data relating to the given image comprises a web link; and wherein the web link is accessed by the processor upon receipt thereof.

20. The communications method of claim 15, wherein at least some of the images are displayed on the electronic device at a same time in the sequence and in different positions on the electronic display; and wherein the at least one passive NFC device comprises a plurality of different passive NFC tags adjacent respective different image positions on the electronic display.

21. The communications method of claim 15, wherein the media device comprises a media server; wherein the processor is configured to send the identifier to the media server via the wireless transceiver; and wherein the data relating to the given image is generated by the media server based upon the identifier and the identifier time; and wherein the media server causes the data relating to the given image to be wirelessly sent to the mobile wireless communications device.

22. The communications method of claim 15, wherein the media device comprises a controller associated with the electronic display; wherein the identifier is sent by the processor of the mobile wireless communications device to the controller via the wireless transceiver and a controller wireless transceiver coupled to the controller; and wherein the data relating to the given image is generated by the controller based upon the identifier and the identifier time, and the data relating to the given image is sent by the controller via the controller wireless transceiver to the mobile wireless communications device.

* * * * *